Figure 1:
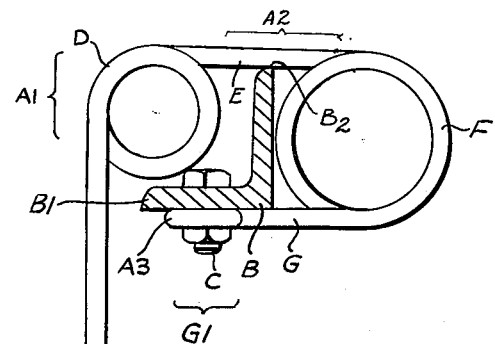

June 13, 1961     J. E. NICHOLSON     2,987,867
TINE AND MOUNTING THEREFOR
Filed Feb. 24, 1959

Inventor
JOHN ERSKINE NICHOLSON
By Toulmin & Toulmin
Attorneys

United States Patent Office 2,987,867
Patented June 13, 1961

2,987,867
TINE AND MOUNTING THEREFOR
John Erskine Nicholson, Ermine House,
Grantham, England
Filed Feb. 24, 1959, Ser. No. 794,962
Claims priority, application Great Britain Oct. 3, 1958
4 Claims. (Cl. 56—400)

This invention concerns improvements in or relating to haymaking machines of the type having tines, and primarily to tractor drawn machines known as tedders in which drum-like formation of tine bars with rows of tines thereon is rotated to carry the rows of tines successively into the cut crop with the tines downwardly and forwardly directed to have a tedding action on the crop.

The tines in many instances are made of spring wire in the form of a leg portion, a coil portion at the attachment end, and an attachment eyelet portion for attachment by a bolt to the tine bars, the coils being adapted to offer a resilience to the tine leg in the direction of the line of draught of the machine so that the tines will be deflected in a plane parallel to the line of draught should they meet an obstruction on the ground and will spring back in said plane to working position upon leaving the obstruction, i.e. the tines are adapted by the coils to allow resilient movement of the tine legs in said plane safely against forces applied in a direction in said plane transversely to the length of the tine legs.

In some tedders the angle of the tines to the ground, as the drum-like formation rotates, is an acute angle such that if the tines meet an obstruction the effect is as of a blow in the direction of the length of the tines, a direction in which the coils of the tines are not competent to act.

An object of the invention is to provide means enabling the satisfactory operation of the tines in spite of forces which may be applied to them not only in the direction in said plane transversely of the tines but also in the direction of their length.

The invention provides in or for a haymaking machine of the type referred to, resilient means which are associated with the tines to act in mutually transverse directions such that forces applied to the tines are absorbed resiliently whether applied in said plane transversely of the tines or in the direction of their length. Conveniently two curved formations are provided at the attachment end of the tines offering resilience in the different directions respectively. The formation offering resilience in the transverse direction may be a coiled portion of the tine itself. The formation offering the resilience in the direction of the length of the tines may be provided by an extension of the tines beyond the coiled portion thereof. The extension may be of coiled or plain U shape formed integral with the tines or initially separate therefrom and secured thereto by attachment means, the arms of the U extending transversely of the tines in said plane. When the extension is integral with the tines, the tines may be secured in position by attachment means securing the free ends of the extension to the tine bars. When the extension is initially separate one of its arms is secured by the first mentioned attachment means to the tines and the other arm is secured by further attachment means to the tine bars.

The extension may embrace the tine bars or it may extend below them. The tine bar or a part attached thereto may constrain the tines and/or the extension against certain movements.

Figure 2:
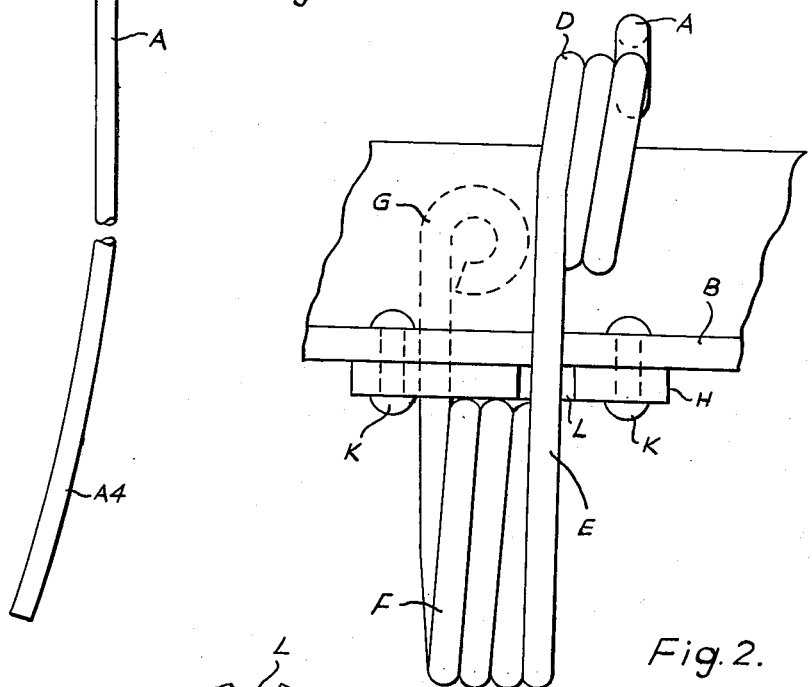
Figure 3:
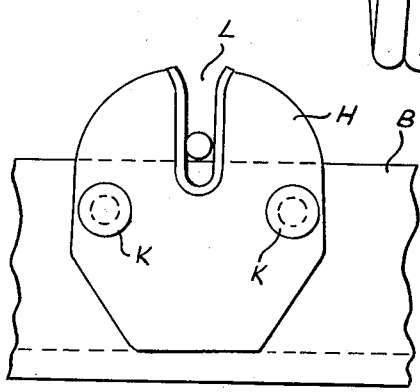

The above and other features of the invention set out in the appended claims are incorporated in the construction which will now be described, as a specific embodiment with reference to the drawings accompanying the specification in which:

FIGURE 1 is a detail view of a tine on a tine bar shown in section for a tedder according to the invention, FIGURE 2 is a plan view of the tine of FIGURE 1 and including the tine bar with a modification, FIGURE 3 is an elevational detail of the tine bar with said modification.

Referring now to FIGURE 1 this tine has a leg A and, formed integrally with it at its attachment end $A_1$, coils D.

In addition there is an extension $A_2$ of U-shape with a coil F formed integrally with the tine. More specifically the wire of the tine extends from the coils D first in a short arm E then in coils F and finally in a further short arm G parallel to the arm E. This coiled U shape extension $a_2$ extends transversely to the length of the tine leg A. The tine is attached to a tine bar B by having an eyelet portion $A_3$ at the free end $G_1$ of the short arm G secured by a bolt C to a transverse flange $B_1$ of the tine bar B, the latter being embraced by the U shape extension $A_2$ (see later description).

The coils D offer resilience to the tine leg A upon forces being applied to the tine leg in a direction transversely of its length in a plane parallel to the line of draught of the machine. The coils F offer resilience to the tine in the direction of the length of the tine leg A.

It will be consequently understood that the use of tines according to the invention have an advantage over other tines in that they can be safely deflected by obstructions on the ground not only in the direction transversely of their length in the line of draught of the machine but also in the direction of their length such that the tines are likely to have a much longer working life in the position at which they are originally set.

Means are conveniently provided with the object of confining the resilience offered by the coils F to movements of the tines in a direction from their tips such as $A_4$ to their attachment ends $A_1$; these means may consist of a stop $B_2$ for the inner side of the arm E, this stop $B_2$ conveniently being part of (or attached to) the tine bar as shown in FIGURE 1.

For preventing the leg E from being displaced in the direction of the length of the tine bar B (see FIGURES 2 and 3), a stamping plate or the like H is secured to the tine bar by means of bolts K between it and the coils F. This plate H has a notch L in which the upper arm E fits so as to prevent the latters displacement along the tine bar and yet allow upward movements of it away from the tine bar. This control of the leg E tends to prevent opening of the coils F by any force which may be applied to the free working end of the tine A in a direction parallel to the tine bar.

What I claim is:

1. A tine for mounting on a tine bar and comprising a tine leg, a first coil on said tine leg arranged for offering resilience to movement of the tine leg in a first direction, a coiled U-shaped extension being integral with said first coil and having spaced arms and an intermediate second coil and extending transversely of the tine leg in a manner embracing a tine bar, fastening means securing one arm of said extension to a tine bar, and means on the tine bar confining resilience offered by the second coil to the tine leg's movement to a second direction.

2. A tine for mounting on a tine bar and comprising a tine leg, a first coil on said tine leg arranged for offering resilience to movement of the tine leg in a first direction, a first arm extending from the first coil and being integral therewith, a second arm parallel to the first arm, a second coil joining the first and second arms, fastening means securing said second arm to the tine bar, and a stop, associated with a tine bar, for the first arm confining resilience offered by the second coil to the tine leg's movement in a second direction.

3. In combination, a tine bar having a transverse flange, a tine, said tine comprising a tine leg having a tip and an attachment end, a first coil at the attachment end of the tine leg for offering resilience to movement of the tine leg transversely thereof, a first arm extending from the first coil, a second arm parallel to the first arm, a second coil integrally joining the first and second arms, bolt fastening means securing the second arm to the transverse flange of the tine bar, and the tine bar having a stop part for the first arm confining resilience offered to the tine leg by the second coil to a direction from the tip of the tine leg to the attachment end thereof.

4. The combination as claimed in claim 2 having a plate secured to the tine bar between it and the second coil, said plate having a notch in which the first arm fits for preventing the first arm from being displaced in the direction of the length of the tine bar and yet allowing upward movement of it away from the tine bar.

References Cited in the file of this patent

UNITED STATES PATENTS

| | | |
|---|---|---|
| 330,108 | Goettmann | Nov. 10, 1885 |
| 728,592 | MacPhail | May 19, 1903 |
| 2,158,299 | Oppenheim | May 16, 1939 |
| 2,193,138 | Meyer | Mar. 12, 1940 |
| 2,641,101 | Redrow | June 9, 1953 |

FOREIGN PATENTS

| | | |
|---|---|---|
| 800,156 | Great Britain | Aug. 20, 1958 |